United States Patent
Lee et al.

(10) Patent No.: US 7,271,678 B2
(45) Date of Patent: Sep. 18, 2007

(54) APPARATUS AND METHOD FOR GENERATING FREQUENCIES

(75) Inventors: Woo-kyung Lee, Hwaseong-si (KR); Jae-hyun Koo, Seoul (KR); Wan-jin Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 78 days.

(21) Appl. No.: 11/232,867

(22) Filed: Sep. 23, 2005

(65) Prior Publication Data
US 2006/0068720 A1 Mar. 30, 2006

(30) Foreign Application Priority Data
Sep. 24, 2004 (KR) .................. 10-2004-0077075

(51) Int. Cl.
*H03C 3/06* (2006.01)
(52) U.S. Cl. .................. 332/127; 332/117; 332/100; 331/42; 331/74; 455/260; 455/76; 455/313
(58) Field of Classification Search ............ 331/74, 331/42; 327/105; 332/100, 117, 127; 455/76, 455/260, 313
See application file for complete search history.

(56) References Cited

U.S. PATENT DOCUMENTS
4,019,153 A * 4/1977 Cox, Jr. et al. ............ 331/1 A

* cited by examiner

*Primary Examiner*—Arnold Kinkead
(74) *Attorney, Agent, or Firm*—Sughrue Mion Pllc.

(57) ABSTRACT

A frequency generation apparatus and a method are provided. The frequency generation apparatus for generating a plurality of center frequencies for use in multi-band hopping communication, includes: an oscillator generating an oscillation frequency; a reference frequency generator multiplying the oscillation frequency by a first multiplication rate to generate a reference frequency; a compensation frequency generator multiplying the oscillation frequency by a second multiplication rate to generate a compensation frequency for compensating for the influence of a frequency offset of the oscillation frequency; and a center frequency generator generating the plurality of center frequencies using the reference frequency and the compensation frequency. Therefore, by compensating for the influence of a frequency offset of an oscillation frequency on the generation of center frequencies, it is possible to generate stable center frequencies.

14 Claims, 5 Drawing Sheets

APPARATUS AND METHOD FOR GENERATING FREQUENCIES

CROSS-REFERENCE TO RELATED APPLICATIONS

This application claims priority from Korean Patent Application No. 2004-77075, filed on Sep. 24, 2004, the entire content of which is incorporated herein by reference.

BACKGROUND OF THE INVENTION

1. Field of the Invention

Apparatuses and methods consistent with the present invention relate to generating frequencies, and more particularly, to generating center frequencies for use in multi-band hopping communication.

2. Description of the Related Art

A frequency generator is used to generate frequencies required for modulation/demodulation and supply the generated frequencies to a modulator/demodulator. In multi-band hopping communication, such a frequency generator generates center frequencies of bands.

A frequency generator generates frequencies required for modulation/demodulation by multiplying an oscillation frequency generated by an oscillator. An oscillation frequency generated by the oscillator generally includes a frequency offset. As a result, a frequency generated by the frequency generator also includes a frequency offset. This is because a frequency generator generates frequencies required for modulation/demodulation using an oscillation frequency generated by an oscillator.

Such a frequency offset deteriorates modulation/demodulation property, and particularly, the deterioration of modulation/demodulation property is a more serious problem in ultra wide multi-band hopping communication.

Therefore, frequency offsets need to be corrected, and accordingly, a method for correcting frequency offsets should be developed.

Conventionally, frequency offset correction has been mainly performed in base band. For this reason, although the conventional frequency offset correction is suitable for use in low-speed communication, it is not suitable for use in high-speed communication such as ultra wide multi-band hopping communication.

Also, the conventional frequency offset correction has generally been performed using a phase locked loop (PLL). However, the conventional frequency offset correction using the PLL is unsuitable for use in ultra wide multi-band hopping communication with a very short band transit time (approximately 9.5 ns).

Therefore, a method for correcting frequency offsets in ultra wide multi-band hopping communication is nowadays needed.

SUMMARY OF THE INVENTION

An aspect of the present invention is to provide a frequency generation apparatus and a method, capable of generating stable center frequencies, by compensating for the influence of a frequency offset of an oscillation frequency on the generation of center frequencies when the center frequencies for use in multi-band hopping communication are generated using the oscillation frequency.

According to an aspect of the present invention, there is provided an apparatus for generating a plurality of center frequencies for use in multi-band hopping communication, including: an oscillator generating an oscillation frequency; a reference frequency generator multiplying the oscillation frequency by a first multiplication rate to generate a reference frequency; a compensation frequency generator multiplying the oscillation frequency by a second multiplication rate to generate a compensation frequency for compensating for the influence of a frequency offset of the oscillation frequency; and a center frequency generator generating the plurality of center frequencies, using the reference frequency generated by the reference frequency generator and the compensation frequency generated by the compensation frequency generator.

The second multiplication rate may be set on the basis of a plurality of frequency offsets of the plurality of center frequencies generated by the center frequency generator, and then applied to the compensation frequency generator.

The second multiplication rate may be a multiplication rate in which any one of a sum, a dispersion, and a standard deviation of the plurality of frequency offsets is minimal.

The compensation frequency generator may be a Direct Digital Synthesizer (DSS).

The plurality of center frequencies may include a first center frequency, a second center frequency, and a third center frequency, and the center frequency generator may include: a first frequency mixer adding the reference frequency with the compensation frequency to generate the first center frequency; and a second frequency mixer adding the first center frequency with a harmonic frequency of the compensation frequency to generate the second center frequency, and subtracting the harmonic frequency of the compensation frequency from the first center frequency to generate the third center frequency.

The plurality of center frequencies may include a first center frequency, a second center frequency, and a third center frequency, and the center frequency generator may include: a first frequency mixer adding the reference frequency with the compensation frequency to generate the first center frequency; a frequency divider dividing the reference frequency by a predetermined division rate to generate a divided frequency; and a second frequency mixer adding the first center frequency with the divided frequency to generate the second center frequency, and subtracting the divided frequency from the first center frequency to generate the third center frequency.

The first center frequency may be approximately 3960 MHz, the second center frequency may be approximately 4480 MHz, the third center frequency may be approximately 3432 MHz, and the compensation frequency may be approximately 264 MHz.

According to another aspect of the present invention, there is provided a method for generating a plurality of center frequencies for use in multi-band hopping communication, including: generating an oscillation frequency; multiplying the oscillation frequency by a first multiplication rate to generate a reference frequency; multiplying the oscillation frequency by a second multiplication rate to generate a compensation frequency for compensating for the influence of the frequency offset of the oscillation frequency; and generating the plurality of center frequencies using the reference frequency and the compensation frequency.

The second multiplication rate may be set on the basis of a plurality of frequency offsets of the plurality of center frequencies which are generated.

The second multiplication rate may be a multiplication rate in which any one of a sum, a dispersion, and a standard deviation of the plurality of frequency offsets is minimal.

The compensation frequency may be generated by a DDS.

The plurality of center frequencies may include a first center frequency, a second center frequency, and a third center frequency, and the generating the plurality of center frequency may comprise: adding the reference frequency with the compensation frequency to generate the first center frequency; adding the first center frequency with a harmonic frequency of the compensation frequency to generate the second center frequency; and subtracting the harmonic frequency of the compensation frequency from the first center frequency to generate the third center frequency.

The plurality of center frequencies may include a first center frequency, a second center frequency, a third center frequency, and the generating the plurality of center frequencies may comprise: adding the reference frequency with the compensation frequency to generate the first center frequency; dividing the reference frequency by a predetermined division rate to generate a divided frequency; adding the first center frequency with the divided frequency to generate the second center frequency; and subtracting the divided frequency from the first center frequency to generate the third center frequency.

The first center frequency may be approximately 3960 MHz, the second center frequency may be approximately 4480 MHz, the third center frequency may be approximately 3432 MHz, and the compensation frequency may be approximately 264 MHz.

BRIEF DESCRIPTION OF THE DRAWINGS

The above aspects and features of the present invention will be more apparent by describing exemplary embodiments of the present invention with reference to the accompanying drawings, in which.

DETAILED DESCRIPTION OF THE EXEMPLARY EMBODIMENTS

Figure 1:
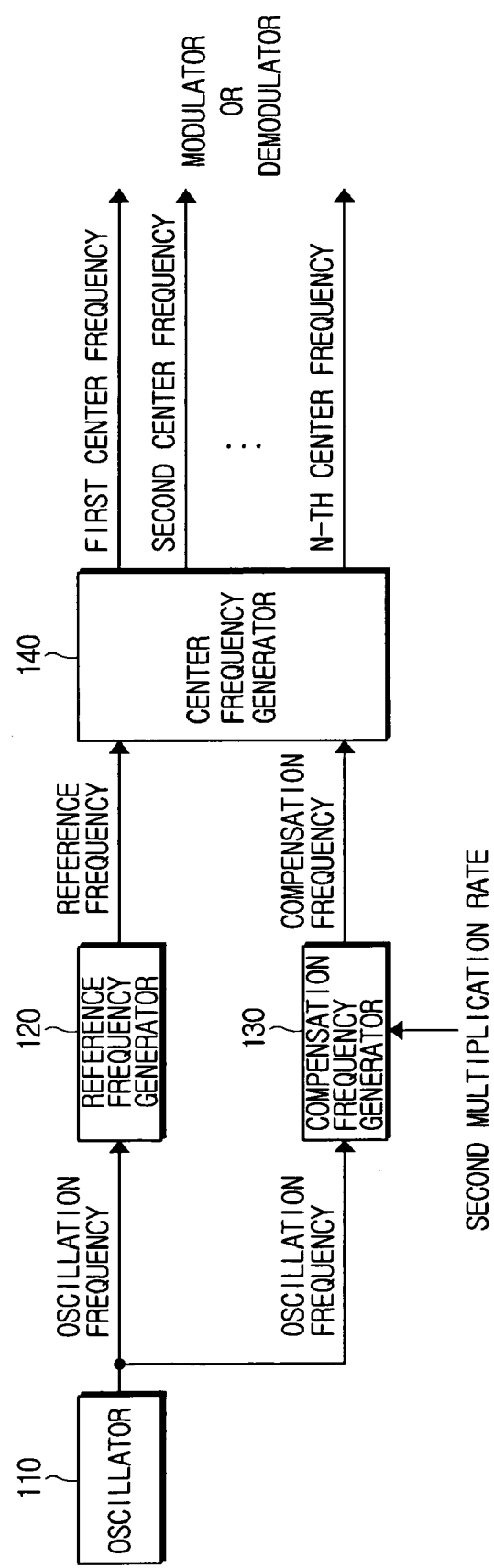
FIG. 1 is a block diagram of a frequency generation apparatus according to an exemplary embodiment of the present invention.

Hereinafter, exemplary embodiments of the present invention will be described in detail with reference to the appended drawings.

In the following description, same drawing reference numerals are used for the same elements even in different drawings. The matters defined in the description such as a detailed construction and elements are provided to assist in a comprehensive understanding of the invention. Thus, it is apparent that the present invention can be carried out without those defined matters. Also, well-known functions or constructions are not described in detail since they would obscure the invention in unnecessary detail.

FIG. 1 is a block diagram of a frequency generation apparatus according to an exemplary embodiment of the present invention. The frequency generation apparatus generates center frequencies for use in multi-band hopping communication, using an oscillation frequency. In particular, the frequency generation apparatus compensates for the influence of a frequency offset of an oscillation frequency on the generation of center frequencies, thereby generating stable center frequencies. This will be described in detail below.

Referring to FIG. 1, the frequency generation apparatus comprises an oscillator 110, a reference frequency generator 120, a compensation frequency generator 130, and a center frequency generator 140.

The oscillator 110 generates an oscillation frequency which is supplied to the reference frequency generator 120 and the compensation frequency generator 130. The oscillator 110 is preferably, but not necessarily, a crystal oscillator with high stability. However, a frequency offset is generated even in the oscillator 110 with high stability. Accordingly, an oscillation frequency generated by the oscillator 110 includes a frequency offset.

The reference frequency generator 120 multiplies the oscillation frequency received from the oscillator 110 by a first multiplication rate to generate a reference frequency. The reference frequency generator 120 is preferably, but not necessarily, a PLL with high stability.

Meanwhile, since the oscillation frequency used for generating the reference frequency includes a frequency offset, the reference frequency generated by the reference frequency generator 120 also includes a frequency offset. Here, the frequency offset of the reference frequency is obtained by multiplying the frequency offset of the oscillation frequency by the first multiplication rate.

The compensation frequency generator 130 generates a compensation frequency using the oscillation frequency received from the oscillator 110. Here, the compensation frequency is used to generate center frequencies using the reference frequency as well as to compensate for the influence of the frequency offset of the oscillation frequency on the generation of the center frequencies.

At this time, the compensation frequency generator 130 multiplies the oscillation frequency by a second multiplication rate and generates the compensation frequency. The second multiplication rate is set by a modulator or a demodulator to be described later, and detailed description thereof will be given later.

The compensation frequency generator 130 may be a DDS. Since a DDS has a very high processing speed and can change its output frequency at a high speed, the DDS is suitable for use in ultra wide multi-band hopping communication allowing high-speed hopping of ultra wide bands.

The center frequency generator 140 generates center frequencies (first through n-th center frequencies) for use in the multi-band hopping communication, using the reference frequency generated by the reference frequency generator 120 and the compensation frequency generated by the compensation frequency generator 130.

The center frequencies generated by the center frequency generator 140 are applied to a modulator (e.g., in a case where the present frequency generation apparatus is installed in a transmitter) or a demodulator (e.g., in a case where the present frequency generation apparatus is installed in a receiver). The modulator or demodulator sets the second multiplication rate on the basis of the frequency offsets of the applied center frequencies and applies the set second multiplication rate to the compensation frequency generator 130. At this time, the second multiplication rate is preferably, but not necessarily, set to a value in which any one of a sum, a dispersion, and a standard deviation of the frequency offsets of the center frequencies is minimal.

Figure 2:
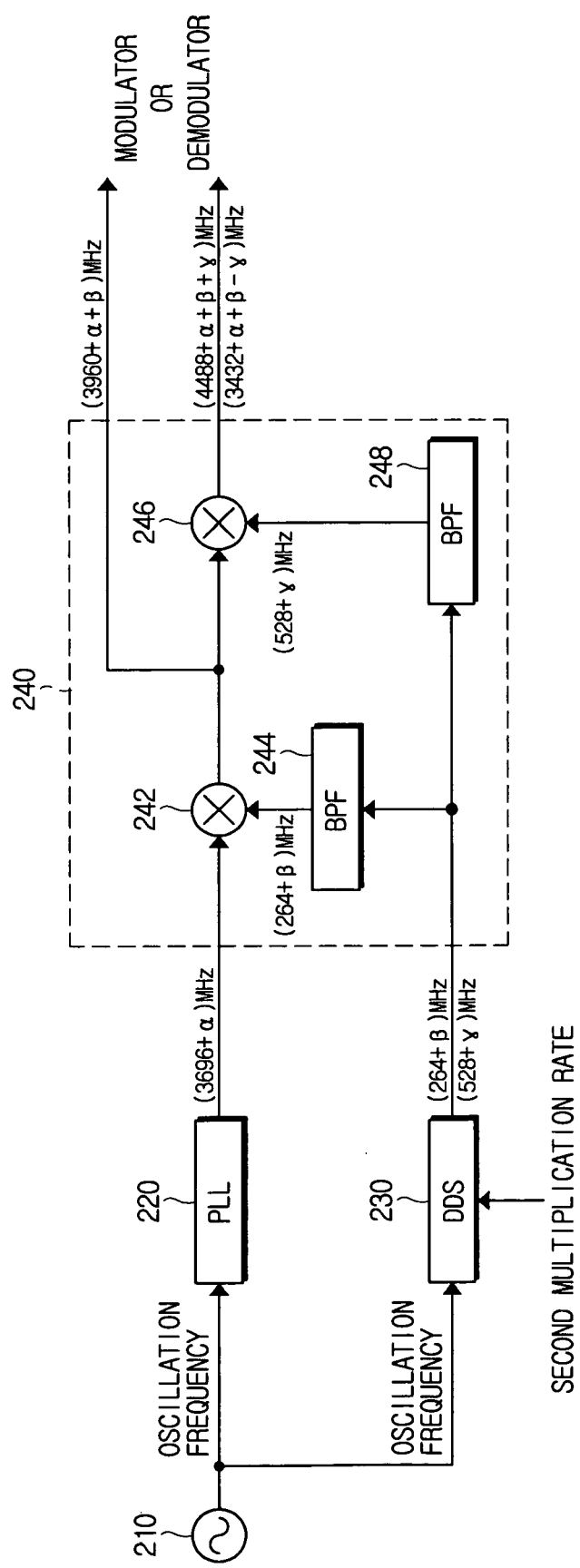
FIG. 2 is a block diagram of a frequency generation apparatus according to another exemplary embodiment of the present invention.

Hereinafter, a frequency generation apparatus according to another exemplary embodiment of the present invention will be described in detail. FIG. 2 is a block diagram of a frequency generation apparatus according to another exemplary embodiment of the present invention. Here, assume that center frequencies generated by the frequency generation apparatus are 3432 MHz, 3960 MHz, and 4488 MHz which are used as center frequencies in ultra wide multi-band hopping communication.

Referring to FIG. 2, the frequency generation apparatus includes a crystal oscillator 210, a PLL 220, a DDS 230, and a center frequency generator 240. The crystal oscillator 210, the PLL 220, the DDS 230, and the center frequency generator 240, as shown in FIG. 2, correspond to the oscillator 110, the reference frequency generator 120, the compensation frequency generator 130, and the center frequency generator 140, as shown in FIG. 1, respectively. Meanwhile, the center frequency generator 240 includes first and second frequency mixers 242 and 246 and first and second band pass filters (BPFs) 244 and 248.

Figure 3:
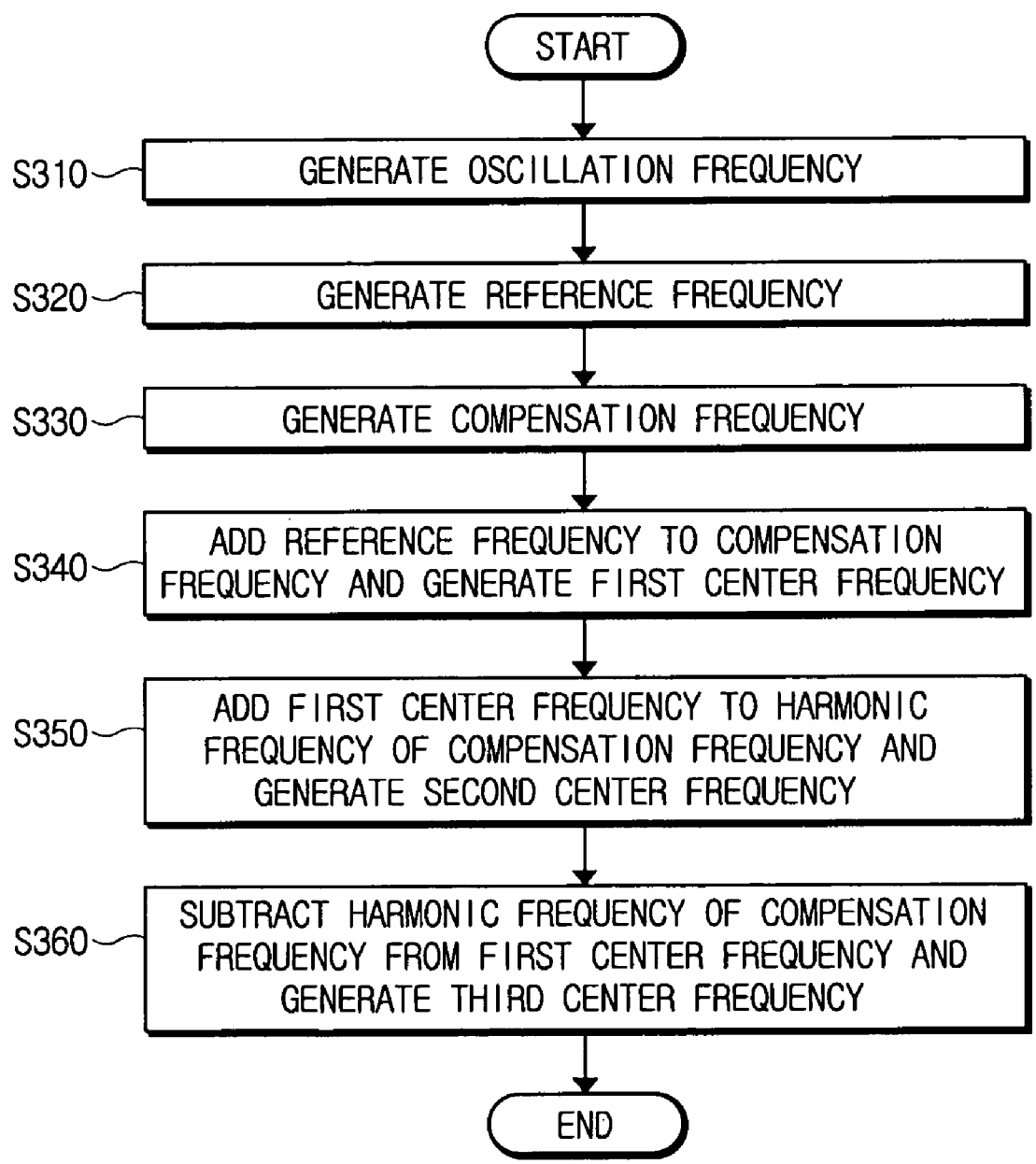
FIG. 3 is a flowchart illustrating a process in which the frequency generation apparatus shown in FIG. 2 generates center frequencies.

Hereinafter, a process in which the frequency generation apparatus shown in FIG. 2 generates center frequencies, will be described in detail with reference to FIG. 3. FIG. 3 is a flowchart illustrating a process in which the frequency generation apparatus shown in FIG. 2 generates center frequencies.

First, the crystal oscillator 210 generates an oscillation frequency which is supplied to the PLL 220 and the DDS 230 (S310). The oscillation frequency generated by the crystal oscillator 210 includes a frequency offset.

The PLL 220 multiplies the oscillation frequency received from the crystal oscillator 210 by a first multiplication rate to generate a reference frequency (S320). Although the reference frequency is ideally 3696 MHz, it becomes (3696+$\alpha$) MHz due to the frequency offset of the oscillation frequency.

Simultaneously, the DDS 230 multiplies the oscillation frequency received from the crystal oscillator 210 by a second multiplication rate to generate a compensation frequency (S330). If the reference frequency is 3696 MHz, that is, in the ideal case where the oscillation frequency has no frequency offset, the compensation frequency is 264 MHz.

However, since the reference frequency is (3696+$\alpha$) MHz due to the frequency offset of the oscillation frequency, the compensation frequency generated by the DDS 230 is (264+$\beta$) MHz. Here, $\beta$ MHz is a frequency for compensating for the influence of the frequency offset of the oscillation frequency on the generation of the center frequencies and is changed according to changes in the second multiplication rate set by the modulator or demodulator.

Meanwhile, the DDS 230 also generates a harmonic frequency (528+$\gamma$) MHz of the compensation frequency, other than the compensation frequency (264+$\beta$) MHz.

Then, the first BPF (Band Pass Filter) 244 filters only the compensation frequency (264+$\beta$) MHz from the output frequencies of the DDS 230, and applies the compensation frequency (264+$\beta$) MHz to the first frequency mixer 242. The first frequency mixer 242 adds the reference frequency (3696+$\alpha$) MHz generated by the PLL 220 to the compensation frequency (264+$\beta$) MHz filtered by the first BPF 244 to generate a first center frequency (3960+$\alpha$+$\beta$) MHz (S340). The generated first center frequency (3960+$\alpha$+$\beta$) MHz is output to the modulator or demodulator.

Also, the second BPF 248 filters only the harmonic frequency (528+$\gamma$) MHz of the compensation frequency from the output frequencies of the DDS 230, and applies the harmonic frequency (528+$\gamma$) MHz to the second frequency mixer 246. Meanwhile, since the harmonic frequency (528+$\gamma$) MHz of the compensation frequency output from the DDS 230 has a small amplitude, it is preferable to amplify the harmonic frequency (528+$\gamma$) MHz before filtering it. Then, the second frequency mixer 246 adds the first center frequency (3960+$\alpha$+$\beta$) MHz generated by the first frequency mixer 242 to the harmonic frequency (528+$\gamma$) MHz of the compensation frequency filtered by the second BPF 248 to generate a second center frequency (4488+$\alpha$+$\beta$+$\gamma$) MHz (S350). The generated second center frequency (4488+$\alpha$+$\beta$+$\gamma$) MHz is output to the modulator or demodulator.

Simultaneously, the second frequency mixer 246 subtracts the harmonic frequency (528+$\gamma$) MHz of the compensation frequency filtered by the second BPF 248 from the first center frequency (3960+$\alpha$+$\beta$) MHz generated by the first frequency mixer 242 to generate a third center frequency (3432+$\alpha$+$\beta$-$\gamma$) MHz (S360). The generated third center frequency (3432+$\alpha$+$\beta$-$\gamma$) MHz is output to the modulator or demodulator.

Meanwhile, the above-described second multiplication rate is set by the modulator or demodulator, on the basis of a frequency offset of a first center frequency (3960+$\alpha$+$\beta$) MHz (hereinafter, simply referred to as a "first frequency offset ($\alpha$+$\beta$) MHz"), a frequency offset of a second center frequency (4488+$\alpha$+$\beta$+$\gamma$) MHz (hereinafter, simply referred to as a "second frequency offset ($\alpha$+$\beta$+$\gamma$) MHz", and a frequency offset of a third center frequency (3432+$\alpha$+$\beta$-$\gamma$) MHz (hereinafter, simply referred to as a "third frequency offset ($\alpha$+$\beta$-$\gamma$) MHz").

For example, the modulator or demodulator obtains $\beta$ MHz in which a sum (3$\alpha$+3$\beta$) MHz of the first frequency offset ($\alpha$+$\beta$) MHz, the second frequency offset ($\alpha$+$\beta$+$\gamma$) MHz, and the third frequency offset ($\alpha$+$\beta$-$\gamma$) MHz is minimal. Also, the modulator or demodulator sets a second multiplication rate at which a compensation frequency to which the obtained $\beta$ MHz is reflected is generated by the DDS 230, and applies the set second multiplication rate to the DDS 230.

At this time, it is possible that the modulator or demodulator sets a second multiplication rate at which a dispersion or a standard deviation of the first frequency offset ($\alpha$+$\beta$) MHz, the second frequency offset ($\alpha$+$\beta$+$\gamma$) MHz, and the third frequency offset ($\alpha$+$\beta$-$\gamma$) MHz is minimal, and applies the set second multiplication to the DDS 230.

Accordingly, the first center frequency (3960+$\alpha$+$\beta$) MHz generated in operation S340 approximates an ideal first center frequency 3960 MHz, the second center frequency (4488+$\alpha$+$\beta$+$\gamma$) MHz generated in operation S350 approximates an ideal second center frequency 4488 MHz, and the third center frequency (3432+$\alpha$+$\beta$-$\gamma$) MHz generated in operation S360 approximates an ideal third center frequency 3432 MHz.

These results are obtained because the compensation frequency (264+$\beta$) MHz generated according to the second multiplication rate in the DDS 230 is used to compensate for the influence of the frequency offset of the oscillation frequency on the generation of the center frequencies.

Figure 4:
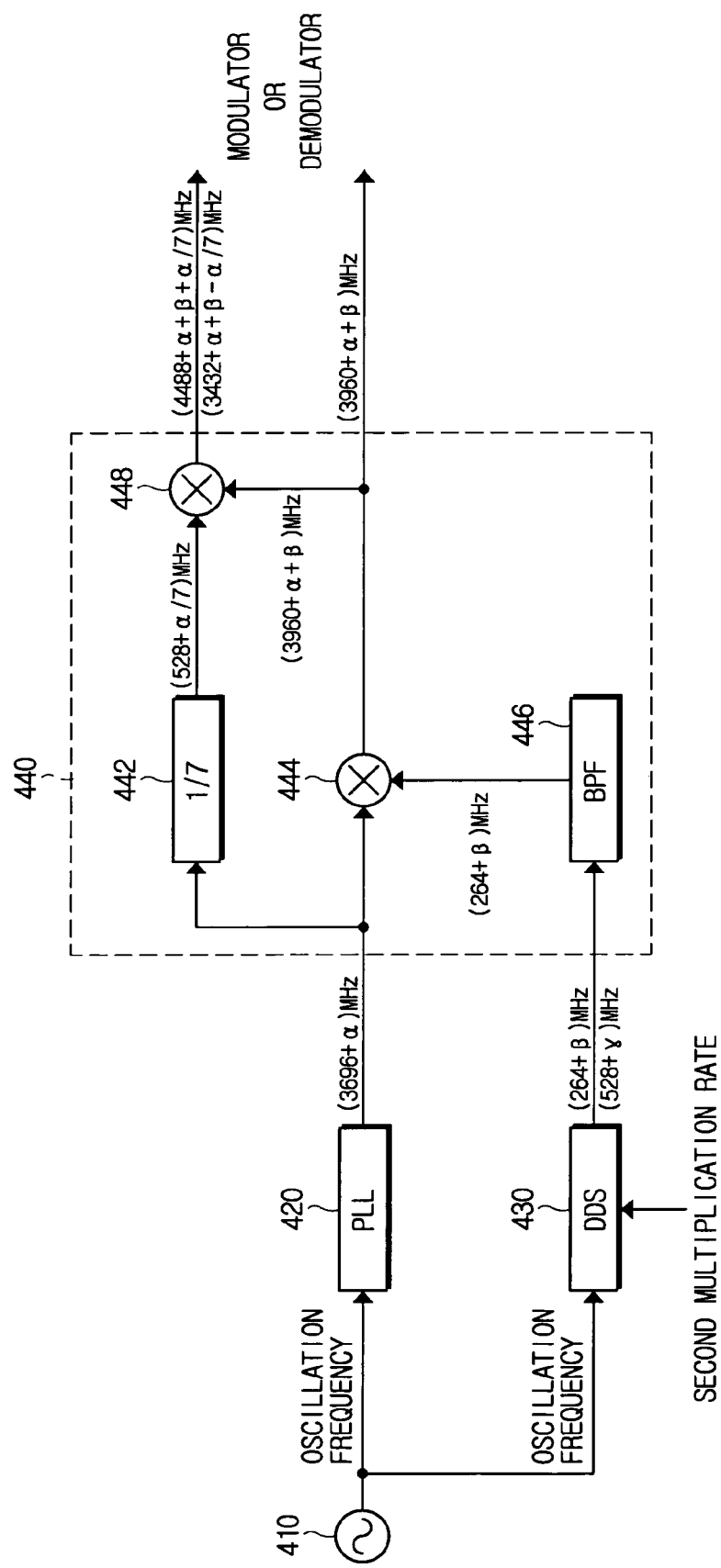
FIG. 4 is a block diagram of a frequency generation apparatus according to another exemplary embodiment of the present invention.

FIG. 4 is a block diagram of a frequency generation apparatus according to another exemplary embodiment of the present invention. Referring to FIG. 4, the frequency generation apparatus includes a crystal oscillator 410, a PLL 420, a DDS 430, and a center frequency generator 440. The crystal oscillator 410, the PLL 420, the DDS 430, the center frequency generator 440, as shown in FIG. 4, correspond to the oscillator 110, the reference frequency generator 120, the compensation frequency generator 130, and the center frequency generator 140, as shown in FIG. 1, respectively. Meanwhile, the center frequency generator 440 includes a frequency divider 442, first and second frequency mixers 444 and 448, and a BPF 446.

Figure 5:
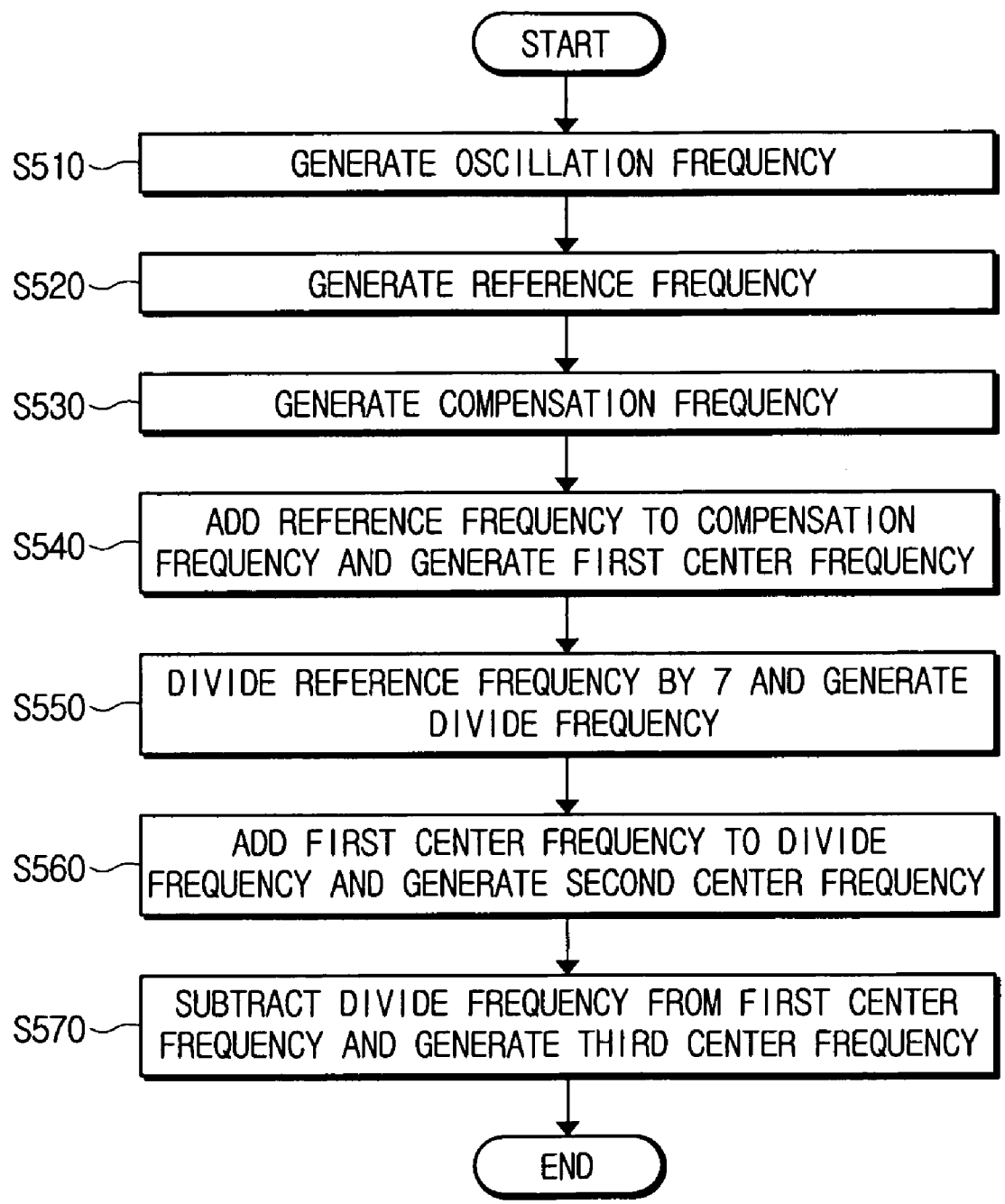
FIG. 5 is a flowchart illustrating a process in which the frequency generation apparatus shown in FIG. 4 generates center frequencies.

Hereinafter, a process in which the frequency generation apparatus shown in FIG. 4 generates center frequencies, will be described in detail with reference to FIG. 5. FIG. 5 is a flowchart illustrating a process in which the frequency generation apparatus shown in FIG. 4 generates center frequencies.

First, the crystal oscillator 410 generates an oscillation frequency which is provided to the PLL 420 and the DDS 430 (S510). Then, the PLL 420 multiplies the oscillation frequency by a first multiplication rate to generate a reference frequency (S520), and simultaneously multiplies the oscillation frequency by a second multiplication rate to generate a compensation frequency (S530).

Here, the reference frequency is $(3696+\alpha)$ MHz and the compensation frequency is $(264+\beta)$ MHz, as described above with reference to FIG. 3, and detailed description thereof is omitted. Also, the DDS 430 can generate a harmonic frequency $(528+\gamma)$ MHz of a compensation frequency, other than the compensation frequency $(264+\beta)$ MHz, as described above with reference to FIG. 3.

Then, the BPF 446 filters only the compensation frequency $(264+\beta)$ MHz from output frequencies of the DDS 430 and applies the compensation frequency $(264+\beta)$ MHz to the first frequency mixer 444. The first frequency mixer 444 adds the reference frequency $(3696+\alpha)$ MHz generated by the PLL 420 to the compensation frequency $(264+\beta)$ MHz filtered by the BPF 446 to generate a first center frequency $(3960+\alpha+\beta)$ MHz (S540). The generated first center frequency $(3960+\alpha+\beta)$ MHz is output to the modulator or demodulator.

Also, the frequency divider 442 divides the reference frequency $(3696+\alpha)$ MHz generated by the PLL 420 by 7 to generate a divided frequency $(528+\alpha/7)$ MHz which is provided to the second frequency mixer 448 (S550).

Then, the second frequency mixer 448 adds the first center frequency $(3960+\alpha+\beta)$ MHz generated by the first frequency mixer 444 to the divided frequency $(528+\alpha/7)$ MHz generated by the frequency divider 442 to generate a second center frequency $(4488+\alpha+\beta+\alpha/7)$ MHz (S560). The generated second center frequency $(4488+\alpha+\beta+\alpha/7)$ MHz is output to the modulator or demodulator.

Simultaneously, the second frequency mixer 448 subtracts the divided frequency $(528+\alpha/7)$ MHz generated by the frequency divider 442 from the first center frequency $(3960+\alpha+\beta)$ MHz generated by the first frequency mixer 444 to generate a third center frequency $(3432+\alpha+\beta-\alpha/7)$ MHz (S570). The generated third center frequency $(3432+\alpha+\beta-\alpha/7)$ MHz is output to the modulator or demodulator.

Meanwhile, the above-described second multiplication rate is set by the modulator or demodulator, on the basis of a first frequency offset $(\alpha+\beta)$ MHz, a second frequency offset $(\alpha+\beta+\alpha/7)$ MHz, and a third frequency offset $(\alpha+\beta-\alpha/7)$ MHz.

For example, the modulator or demodulator calculates $\beta$ MHz in which any one of a sum $(3\alpha+3\beta)$ MHz, a dispersion, and a standard deviation of the first frequency offset $(\alpha+\beta)$ MHz, the second frequency offset $(\alpha+\beta+\alpha/7)$ MHz, and the third frequency offset $(\alpha+\beta-\alpha/7)$ MHz is minimal. Also, the modulator or demodulator sets a second multiplication rate at which a compensation frequency to which the obtained $\beta$ MHz is reflected is generated by the DDS 430, and applies the set second multiplication rate to the DDS 430.

Accordingly, the first center frequency $(3960+\alpha+\beta)$ MHz generated in operation S540 approximates an ideal first center frequency 3960 MHz, the second center frequency $(4488+\alpha+\beta+\alpha/7)$ MHz generated in operation S560 approximates an ideal second center frequency 4488 MHz, and the third center frequency $(3432+\alpha+\beta-\alpha/7)$ MHz generated in operation S570 approximates an ideal third center frequency 3432 MHz.

These results are obtained by using the compensation frequency $(264+\beta)$ MHz generated according to the second multiplication rate in the DDS 430 to compensate for the influence of the frequency offset of the oscillation frequency on the generation of the center frequencies.

As described above, according to an exemplary embodiment of the present invention, when center frequencies for use in multi-band hopping communication are generated using an oscillation frequency, by compensating for the influence of a frequency offset of the oscillation frequency on the generation of the center frequencies, it is possible to generate stable center frequencies. Accordingly, modulation and demodulation properties are enhanced.

Also, since a frequency generation apparatus according to an exemplary embodiment of the present invention is implemented using an oscillator (crystal oscillator) and a compensation frequency generator (DDS), the frequency generation apparatus has advantages in size and manufacturing cost. Also, since only one oscillator (crystal oscillator) and only one correction frequency generator (DDS) with high power consumption are used, power consumption can be reduced.

The foregoing exemplary embodiment and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An apparatus for generating a plurality of center frequencies for use in multi-band hopping communication, the apparatus comprising:
    an oscillator which generates an oscillation frequency;
    a reference frequency generator which multiplies the oscillation frequency by a first multiplication rate to generate a reference frequency;
    a compensation frequency generator which multiplies the oscillation frequency by a second multiplication rate to generate a compensation frequency for compensating for an influence of a frequency offset of the oscillation frequency; and
    a center frequency generator which generates the plurality of center frequencies, using the reference frequency generated by the reference frequency generator and the compensation frequency generated by the compensation frequency generator,
    wherein the second multiplication rate is set on the basis of a plurality of frequency offsets of the plurality of center frequencies generated by the center frequency generator.

2. The apparatus as claimed in claim 1, wherein the second multiplication rate is a multiplication rate at which any one of a sum, a dispersion, and a standard deviation of the plurality of frequency offsets is minimal.

3. An apparatus for generating a plurality of center frequencies for use in multi-band hopping communication, the apparatus comprising:

an oscillator which generates an oscillation frequency;
a reference frequency generator which multiplies the oscillation frequency by a first multiplication rate to generate a reference frequency;
a compensation frequency generator which multiplies the oscillation frequency by a second multiplication rate to generate a compensation frequency for compensating for an influence of a frequency offset of the oscillation frequency; and
a center frequency generator which generates the plurality of center frequencies, using the reference frequency generated by the reference frequency generator and the compensation frequency generated by the compensation frequency generator,
wherein the compensation frequency generator is a Direct Digital Synthesizer.

4. An apparatus for generating a plurality of center frequencies for use in multi-band hopping communication, the apparatus comprising:
an oscillator which generates an oscillation frequency;
a reference frequency generator which multiplies the oscillation frequency by a first multiplication rate to generate a reference frequency;
a compensation frequency generator which multiplies the oscillation frequency by a second multiplication rate to generate a compensation frequency for compensating for an influence of a frequency offset of the oscillation frequency; and
a center frequency generator which generates the plurality of center frequencies, using the reference frequency generated by the reference frequency generator and the compensation frequency generated by the compensation frequency generator,
wherein the plurality of center frequencies include a first center frequency, a second center frequency, and a third center frequency, and
the center frequency generator comprises:
a first frequency mixer which adds the reference frequency to the compensation frequency to generate the first center frequency; and
a second frequency mixer which adds the first center frequency to a harmonic frequency of the compensation frequency to generate the second center frequency, and subtracts the harmonic frequency of the compensation frequency from the first center frequency to generate the third center frequency.

5. The apparatus as claimed in claim 4, wherein the first center frequency is approximately 3960 MHz, the second center frequency is approximately 4480 MHz, the third center frequency is approximately 3432 MHz, and the compensation frequency is approximately 264 MHz.

6. An apparatus for generating a plurality of center frequencies for use in multi-band hopping communication, the apparatus comprising:
an oscillator which generates an oscillation frequency;
a reference frequency generator which multiplies the oscillation frequency by a first multiplication rate to generate a reference frequency;
a compensation frequency generator which multiplies the oscillation frequency by a second multiplication rate to generate a compensation frequency for compensating for an influence of a frequency offset of the oscillation frequency; and
a center frequency generator which generates the plurality of center frequencies, using the reference frequency generated by the reference frequency generator and the compensation frequency generated by the compensation frequency generator,
wherein the plurality of center frequencies include a first center frequency, a second center frequency, and a third center frequency, and
the center frequency generator comprises:
a first frequency mixer which adds the reference frequency to the compensation frequency to generate the first center frequency;
a frequency divider which divides the reference frequency by a predetermined division rate to generate a divided frequency; and
a second frequency mixer which adds the first center frequency to the divided frequency to generate the second center frequency, and subtracts the divided frequency from the first center frequency to generate the third center frequency.

7. The apparatus as claimed in claim 6, wherein the first center frequency is approximately 3960 Mhz, the second center frequency is approximately 4480 MHz, the third center frequency is approximately 3432 MHz, and the compensation frequency is approximately 264 MHz.

8. A method for generating a plurality of center frequencies for use in multi-band hopping communication, the method comprising:
generating an oscillation frequency;
multiplying the oscillation frequency by a first multiplication rate to generate a reference frequency;
multiplying the oscillation frequency by a second multiplication rate to generate a compensation frequency for compensating for an influence of the frequency offset of the oscillation frequency; and
generating the plurality of center frequencies using the reference frequency and the compensation frequency,
wherein the second multiplication rate is set on the basis of a plurality of frequency offsets of the plurality of center frequencies which are generated.

9. The method as claimed in claim 8, wherein the second multiplication rate is a multiplication rate at which any one of a sum, a dispersion, and a standard deviation of the plurality of frequency offsets is minimal.

10. A method for generating a plurality of center frequencies for use in multi-band hopping communication, the method comprising:
generating an oscillation frequency;
multiplying the oscillation frequency by a first multiplication rate to generate a reference frequency;
multiplying the oscillation frequency by a second multiplication rate to generate a compensation frequency for compensating for an influence of the frequency offset of the oscillation frequency; and
generating the plurality of center frequencies using the reference frequency and the compensation frequency,
wherein the compensation frequency is generated by a Direct Digital Synthesizer.

11. A method for generating a plurality of center frequencies for use in multi-band hopping communication, the method comprising:
generating an oscillation frequency;
multiplying the oscillation frequency by a first multiplication rate to generate a reference frequency;
multiplying the oscillation frequency by a second multiplication rate to generate a compensation frequency for compensating for an influence of the frequency offset of the oscillation frequency; and generating the plurality of center frequencies using the reference frequency and the compensation frequency, wherein the plurality of center frequencies include a first center frequency, a second center frequency, and a third center frequency, and the generating the plurality of center frequencies comprises:

adding the reference frequency to the compensation frequency to generate the first center frequency;

adding the first center frequency to a harmonic frequency of the compensation frequency to generate the second center frequency; and subtracting the harmonic frequency of the compensation frequency from the first center frequency to generate the third center frequency.

12. The method as claimed in claim 11, wherein the first center frequency is approximately 3960 MHz, the second center frequency is approximately 4480 MHz, the third center frequency is 3432 MHz, and the compensation frequency is approximately 264 MHz.

13. A method for generating a plurality of center frequencies for use in multi-band hopping communication, the method comprising:

generating an oscillation frequency;

multiplying the oscillation frequency by a first multiplication rate to generate a reference frequency;

multiplying the oscillation frequency by a second multiplication rate to generate a compensation frequency for compensating for an influence of the frequency offset of the oscillation frequency; and generating the plurality of center frequencies using the reference frequency and the compensation frequency, wherein the plurality of center frequencies include a first center frequency, a second center frequency, a third center frequency, and the generating the plurality of center frequencies comprises:

adding the reference frequency to the compensation frequency to generate the first center frequency, dividing the reference frequency by a predetermined division rate to generate a divided frequency;

adding the first center frequency to the divided frequency to generate the second center frequency; and subtracting the divided frequency from the first center frequency to generate the third center frequency.

14. The frequency generation method as claimed in claim 13, wherein the first center frequency is approximately 3960 MHz, the second center frequency is approximately 4480 MHz, the third center frequency is approximately 3432 MHz, and the compensation frequency is approximately 264 MHz.

* * * * *